Figure 1:
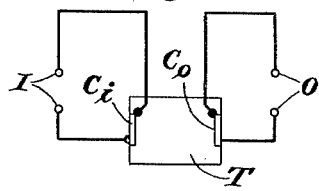

May 30, 1950 — G. W. WALTON — 2,509,545
TELEVISION SYSTEM FOR SIMULTANEOUSLY MODULATING AND PROJECTING A PLURALITY OF LIGHT LINES
Filed March 26, 1946 — 2 Sheets-Sheet 1

Inventor:
George W. Walton,
By Cushman, Darby & Cushman
Attorneys.

Patented May 30, 1950

2,509,545

UNITED STATES PATENT OFFICE 2,509,545

TELEVISION SYSTEM FOR SIMULTANEOUSLY MODULATING AND PROJECTING A PLURALITY OF LIGHT LINES

George William Walton, Farnham Common, England

Application March 26, 1946, Serial No. 657,171
In Great Britain April 10, 1945

3 Claims. (Cl. 178—7.3)

This invention relates to time delaying devices. One of its objects is to provide improved time delaying devices which more nearly satisfy the condition of aperiodicity than do those in common use. Such devices may be used for a great variety of purposes, e. g. in the fields of telephony, telegraphy, ordinary wireless broadcasting (for controlling echo effects and other purposes) and television where they may replace the delaying networks hitherto employed. It is a further object of the invention to provide an improved television receiver employing more than one light modulator, preferably a supersonic cell light modulator of the type disclosed for example in the British patent specification No. 439,236, in which one or more of such delaying devices are used for the purpose of ensuring the proper time relation between the excitation of the different light modulators.

According to the principal feature of the present invention a time delaying device comprises a preferably solid or liquid body, suitable for having supersonic mechanical waves set up within it, exciting means, such as a piezo-electric crystal, for setting up such supersonic waves in said body in response to applied supersonic electric oscillations, and wave responsive means for picking up said mechanical waves and for converting them into electrical oscillations. A time delay will then be introduced in the output relatively to the input electrical oscillations owing to the finite velocity of propagation of mechanical supersonic waves through said body.

The said wave responsive means may be of any suitable kind. They may for example consist of a piezo-electric crystal suitably disposed relatively to the said exciting means according to the time delay required, and provided with a pair of electrodes. The crystal is set in vibration by the arriving mechanical waves and sets up corresponding differences in potential between the electrodes. If the said body is transparent, or if it is reflecting and suited to have its reflection altered to a sufficient degree by supersonic waves set up in it, then an optical photo-electric pick-up device may be used.

In a television receiver, according to a further feature of the present invention, there is provided a plurality of light modulators which are coupled each one to the next through a time delaying device according to the principal feature of the invention. The time constants of the couplings are preferably so chosen that a vertical line (assuming scansion to take place along horizontal lines) is reproduced as a vertical line, and for this purpose the time delay between the inputs of two light modulators is made equal to the duration of one picture line or to an integral multiple thereof. Thus it is arranged that when any modulator receives the $z$th signal (corresponding to the $z$th picture element) of any line, all the other modulators receive the $z$th signals of corresponding other lines. This application of the present invention makes possible an increase in the number of picture elements rendered visible simultaneously and in a corresponding increase in the efficiency of the television receiving system.

The invention will be described in more detail and by way of example with reference to the accompanying drawings in which—

Figure 2:
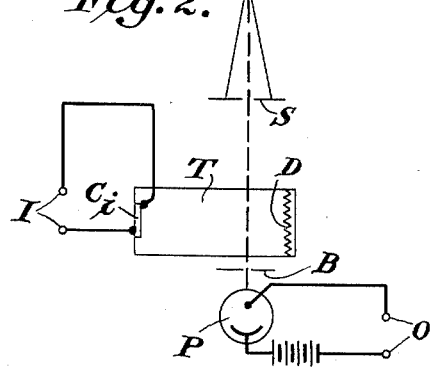
Figure 3:
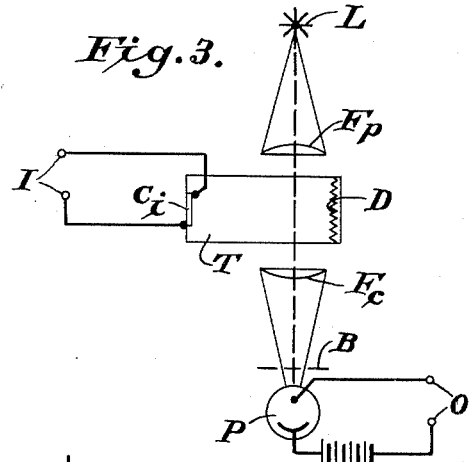
Figure 4:
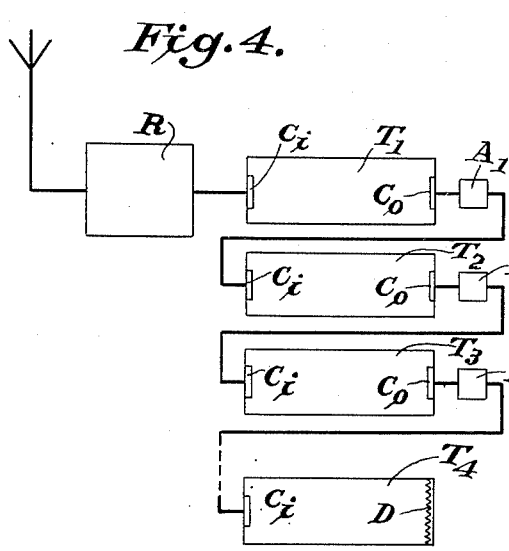
Figure 5:
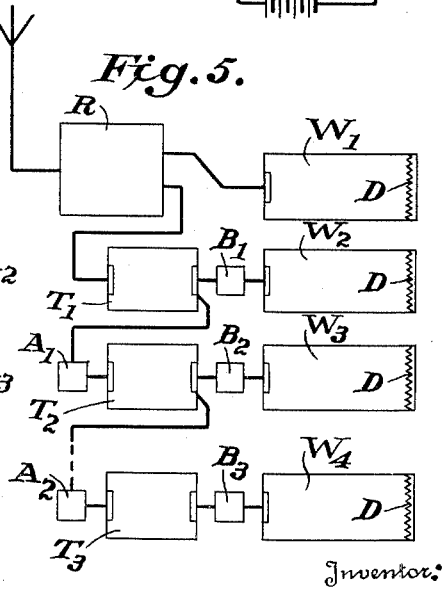
Figure 6:
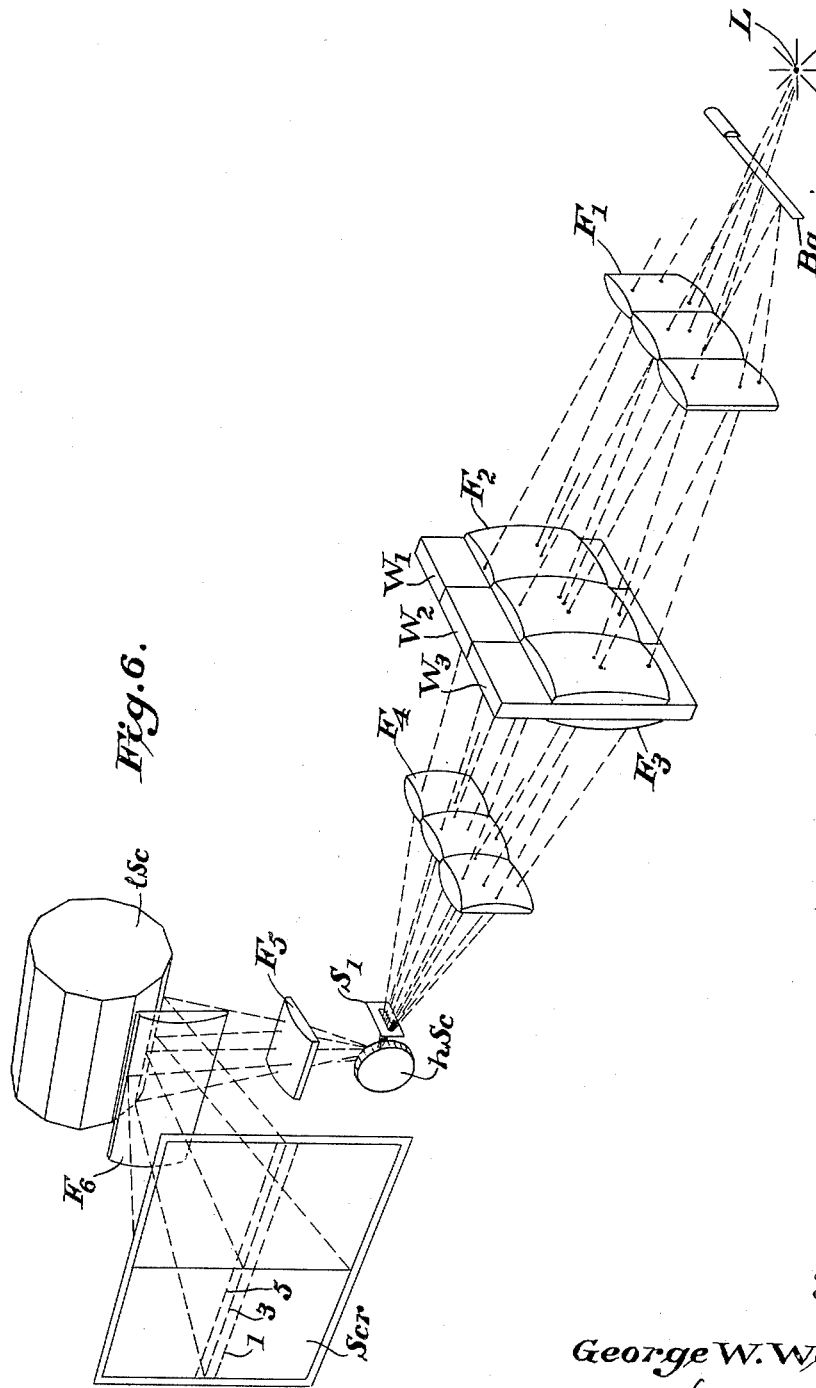

Fig. 1 illustrates schematically a simple form of time delaying device according to the invention, Figs. 2 and 3 illustrate schematically two modifications of the arrangement of Fig. 1 using optical photo-electric pick-up devices, Figs. 4 and 5 illustrate by block diagrams two forms of television receiving equipment according to the invention, and Fig. 6 illustrates the general optical set-up of a television receiver according to the invention.

The device of Fig. 1 comprises a body T, capable of having supersonic mechanical waves set up in it, and provided with an input piezo-electric crystal $C_i$ excited by input oscillatory voltages at I and with an output piezo-electric crystal $C_o$ excited by arriving supersonic mechanical waves and in consequence giving rise to oscillatory output voltages at O. The voltages I may be of a carrier frequency modulated in any desired manner and the voltages at O will be delayed relatively to those at I by the time taken for mechanical waves to travel from $C_i$ to $C_o$. The body T may be solid but preferably consists of a liquid enclosed in a suitable vessel, since the pattern of supersonic oscillations set up in a solid when excited will usually be more complex than that in a liquid and therefore less desirable for most purposes. Care should, however, be taken to prevent excessive reflection of the supersonic waves from the output crystal $C_o$ and the crystal may therefore be provided with a suitable surface damping layer in a manner well understood in the art.

In the device illustrated in Figs. 2 and 3 it is assumed that the body T is transparent. The pick-up device in Fig. 2 consists of a light source L, a screen S having a very narrow slot through which a very thin band of light is transmitted to pass through the body T, and second slotted screen B and a photo-electric cell P. The following considerations will determine the dimensions to be chosen. It will be assumed that the input voltage at I is a carrier of very high frequency, say of the order of 10 mc./s, and is amplitude modulated with a lower frequency, say of the order of 10,000 cycles per second, or with a band of frequencies extending up to 10,000 cycles per second. The cross sectional dimension of the light beam transmitted through T in the direction of travel of the mechanical waves is made equal to or less than half the wave-length of the carrier waves in the body T.

The mechanical waves cause narrow zones of alternate high and low pressure to pass across the light beam and these zones act in a manner similar to a diffraction grating. The slot in the screen B is arranged to allow the undiffracted rays to pass but suppresses the diffracted rays. The intensity of the light reaching the photo-cell P will therefore be modulated at the carrier frequency, as well as at the modulation frequency or frequencies. The voltage at O will therefore be a faithful reproduction of that at I but will be delayed in time by the time of propagation of the waves $C_i$ to the light beam in the medium by which the body T is constituted.

A suitable damping substance D may be provided to prevent appreciable reflexion of the mechanical waves.

In the arrangement of Fig. 3, light from the source L is rendered parallel by an optical system $F_p$, passes through the body T and is concentrated by a second optical system $F_c$ on to a photo-electric cell P, a diaphragm B being interposed between the body T and the cell P.

In both Figs. 2 and 3 the screen or diaphragm may have either a slot which suppresses the diffracted light and allows the undiffracted to pass, or else a stop which suppresses the undiffracted light and passes the diffracted. Alternatively if the cathode of the cell P is of small enough size, the member B can be dispensed with.

In the case of Fig. 3 it may be assumed that the nature of the oscillations fed at I is the same as in the case assumed for Fig. 2. In Fig. 3, however, the cross-sectional dimension of the light beam in the direction of travel of the mechanical waves is made equal to or less than half the wavelength (in the medium of the body T) of the highest modulation frequency, in this case 10,000 cycles per second. Assuming that the said dimension is great compared with the carrier wavelength, there will be no appreciable modulation of the light falling on the cell P at the carrier frequency, but this light will be modulated at the modulation frequency or frequencies. If a delayed modulated carrier output is required, the output from O can be used to modulate such a carrier.

Referring to Fig. 4, R represents a television receiving device embodying any known suitable apparatus for receiving, separating and amplifying image and synchronising signals. The image signals are applied to the input crystal $C_i$ of a first supersonic time delay cell $T_1$ of the kind shown in Fig. 1. The signals applied are in the form of modulation of a carrier wave which may be the original, received carrier wave, or an intermediate frequency obtained by heterodyning the received signals with the aid of a suitable local oscillator.

The output of the cell $T_1$ taken from $C_0$ is applied to a device represented by $A_1$ which may comprise an amplifier to compensate for the attenuation in the cell, any filters that may be required and the like, and the output from the device $A_1$ is fed to the input crystal $C_i$ of the next cell $T_2$ and so on, any desired number of cells $T_1$, $T_2$ etc. being included and the last being provided only with suitable damping means D, no output crystal $C_0$ being needed. Suitable damping means are also provided in association with each output crystal $C_0$. Pick-up means as shown in Fig. 2 or 3 may be provided instead of crystals $C_0$ for coupling the cells $T_1$, $T_2$ etc.

Light modulating means are provided in association with each cell $T_1$, $T_2$ etc. or with the device $A_1$, $A_2$ etc. For example modulation may be provided as shown in Fig. 3, those parts of the bodies of the cells $T_1$, $T_2$ etc. through which light is passed being transparent. The remainder of the bodies need not be transparent. The light beams are preferably passed through the cells near to their input crystals $C_i$ since here the attenuation of the waves is a minimum.

Each cell $T_1$, $T_2$, etc. may be divided into two separate electrically or mechanically coupled parts, the left hand parts being light modulators and being of a material which has suitable optical properties and the right hand parts acting only as time delay devices and their material not necessarily having any optical properties.

In considering the operation of the arrangement of Fig. 4, it will again be assumed that scanning is in horizontal lines, and it will also be assumed that the lines are numbered from 1 to $n$ in the order in which they are scanned and the cells numbered from 1 to $m$ from the top in Fig. 4. It is arranged that the time delay introduced between the signals at the inputs of successive cells is equal to the line scanning period. It will then be clear that at the moment when the first signal of the $n^{th}$ line excites the crystal $C_i$ of the $m^{th}$ cell, the first signal of the $(n-1)^{th}$ line will excite the crystal $C_i$ of the $(m+1)^{th}$ cell. Thus if suitable scanning means are associated with the arrangement it is possible to reproduce simultaneously $m$ lines of the picture. The greater the number of cells $T_1$, $T_2$ etc. provided, the greater the optical efficiency of the arrangement as a whole can be made. If it is possible to provide one cell per line, then all the lines can be reproduced simultaneously. In this arrangement the cells $T_1$, $T_2$ etc. are connected in cascade and each performs the functions of light modulator and time delaying device.

It is not essential, however, that the light modulators and time delay devices should be connected in cascade. In Fig. 5, for example, there is shown an arrangement in which time delay cells $T_1$, $T_2$ etc. alone are coupled in cascade through devices $A_1$, $A_2$ etc. as in Fig. 4 and the light modulators are branched from the receiver R and the outputs of the devices $T_1$, $T_2$ etc., the modulator $W_1$ being coupled direct to the output of the receiver R and the modulators $W_2$, $W_3$ etc. being coupled to the outputs of delay devices $T_1$, $T_2$ etc. through devices $B_1$, $B_2$ etc. which may have the same functions as the devices $A_1$, $A_2$ etc. The light modulators $W_1$, $W_2$ etc. may be of the kind shown in Fig. 3 or they may be of any other known or suitable kind.

One way in which the arrangement of Fig. 4 or 5 can be applied to the reproduction of television pictures is shown in Fig. 6 where three light modulators $W_1$, $W_2$, and $W_3$ are employed. It will be assumed that these are of the kind shown in Fig. 5, separate delay devices (not shown) being included.

In Fig. 6, light from a source L is focused by a triple optical systems $F_1$, $F_2$, $F_3$ and $F_4$ through a slotted screen $S_1$ on to a high speed scanning mirror drum $hSc$. A bar $B_a$ is arranged in the path of the light and normally prevents light passing through the slot in $S_1$. When light is diffracted, as already described, by waves set up in any of the modulators $W_1$, $W_2$ or $W_3$, some of the diffracted light will pass the slot.

The light from the drum $hSc$ passes through an optical system $F_5$, is reflected by a low speed scanner $lSc$ and passes through a further optical system $F_6$ on to a reproducing screen $Scr$. Corresponding portions of three lines 1, 3 and 5 are thus reproduced simultaneously, one by the light through each of the cells $W_1$, $W_2$ and $W_3$.

Each of the cells $W_1$, $W_2$ and $W_3$ operates in conjunction with the optical systems and scanning drums in the manner described in specification No. 439,236. Thus the light modulation effect corresponding to any one picture element moves upward through the cell ($W_1$ for example) at a velocity equal to the velocity of propagation of the supersonic waves in the body of the cell and this movement is counteracted, so far as the corresponding image on the screen $Scr$ is concerned by the rotation of the high speed scanner $hSc$ so that this image appears stationary on the screen.

The gaps between successive scanning lines on the screen $Scr$ caused by the physical construction of the cells $W_1$, $W_2$ and $W_3$ render the arrangement particularly suitable for interlaced scanning, the lines 1, 3 and 5 then being alternate scanning lines and lines 2, 4, 6 etc. being scaned at the next traverse.

Although the invention has been described with particular reference to its use in conjunction with light modulators of the kind described in specification No. 439,236, it may be used with any other known or suitable light modulating device.

I claim:

1. A television receiving system in which line scanning signals are received sequentially, including a source of light, a plurality of distinct optical paths for said light, supersonic light modulating cells in each of said paths, each of said cells comprising a transparent body adapted for the transmission of supersonic waves therethrough and exciting means adapted to create waves in said body, means for applying said line scanning signals to the exciting means of the first of said cells, and a time delay circuit coupling the exciting means of the other cells in series to each other and to the exciting means of said first cell, the time delay between successive cells being equal to a whole number of lines.

2. A system as defined in claim 1, wherein the exciting means of each successive cell is activated by electrical oscillations derived from wave responsive means disposed in the preceding cell at a suitable distance from the exciting means of the preceding cell and operative to convert waves created thereby into electrical oscillations.

3. A television receiving system in which line scanning signals are received sequentially, including a source of light, a plurality of distinct optical paths for said light, supersonic light modulating cells in each of said paths, a time delay device associated with each of said cells, each of said time delay devices comprising a body adapted for the transmission of supersonic mechanical waves therethrough, exciting means adapted to create waves in said body and wave responsive means disposed at a suitable distance from said exciting means for converting the waves so created into electrical oscillations, the time delay of each of said devices being equal in duration to a whole number of lines, means for applying said line scanning signals to the exciting means of one of said time delay devices, the other time delay devices being coupled to each other and said one device in series, each of said light modulating cells being coupled in series to the wave responsive means of its associated time delay device to produce supersonic waves therein corresponding to the electrical oscillations received from said time delay device.

GEORGE WILLIAM WALTON.

REFERENCES CITED

The following references are of record in the file of this patent:

UNITED STATES PATENTS

| Number | Name | Date |
|---|---|---|
| 2,155,660 | Jeffree | Apr. 25, 1939 |
| 2,270,232 | Rosenthal | Jan. 20, 1942 |
| 2,401,094 | Nicholson | May 28, 1946 |
| 2,407,294 | Shockley et al. | Sept. 10, 1946 |
| 2,418,964 | Arenberg | Apr. 15, 1947 |

FOREIGN PATENTS

| Number | Country | Date |
|---|---|---|
| 48,431 | France | Oct. 13, 1936 |
| 506,877 | Great Britain | June 6, 1939 |
| 860,481 | France | Jan. 16, 1941 |